No. 871,132.

PATENTED NOV. 19, 1907.

E. H. MANNING.
CHANGEABLE SPEED GEARING.
APPLICATION FILED NOV. 21, 1906.

Witnesses
Inventor
Ebenezer H. Manning,
By Victor J. Evans
Attorney

UNITED STATES PATENT OFFICE.

EBENEZER H. MANNING, OF ELKHART, INDIANA.

CHANGEABLE-SPEED GEARING.

No. 871,132.　　　Specification of Letters Patent.　　　Patented Nov. 19, 1907.

Application filed November 21, 1906. Serial No. 344,479.

*To all whom it may concern:*

Be it known that I, EBENEZER H. MANNING, a citizen of the United States, residing at Elkhart, in the county of Elkhart and State of Indiana, have invented new and useful Improvements in Changeable-Speed Gearing, of which the following is a specification.

This invention relates to changeable speed gearing of the type embodying a drive shaft and a driven shaft operated therefrom through the medium of intermediate frictional gearing, and has for its objects to provide a comparatively simple, inexpensive device of this character wherein the friction wheels will be positively and yieldably held to their work, one in which the transmission speed changing wheel may be readily actuated for varying the speed of the driven shaft relative to that of the drive shaft, and one in which the friction surface of the transmission wheel will at all times maintain the requisite frictional hold upon the coöperating friction wheels.

With these and other objects in view, the invention comprises the novel features of construction and combination of parts more fully hereinafter described.

Figure 1:
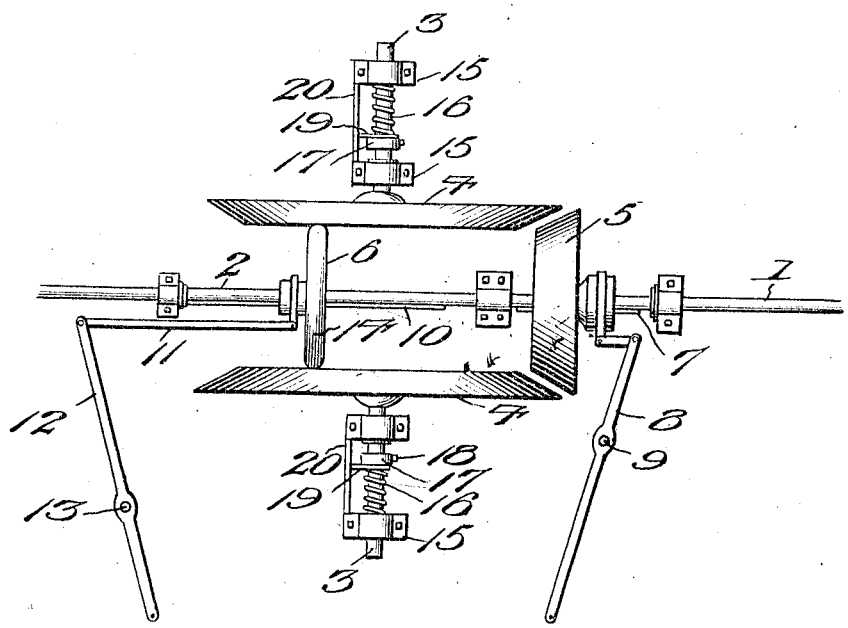
Figure 2:
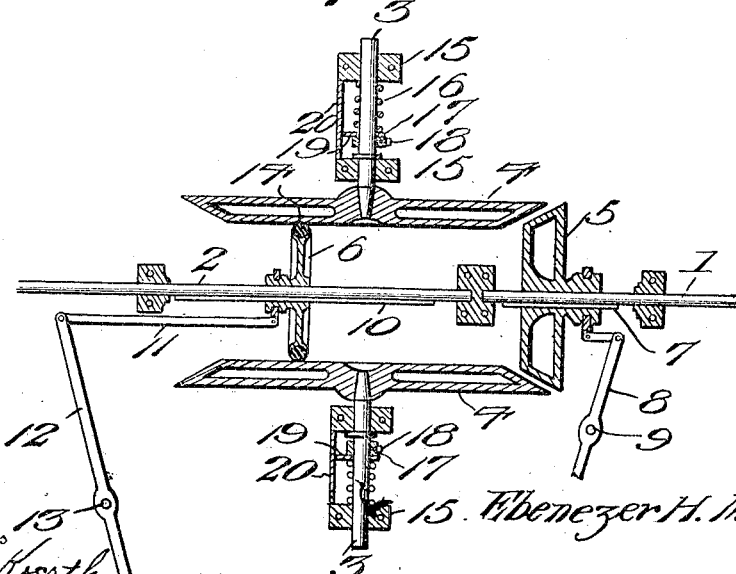

In the accompanying drawings; Figure 1 is a top plan view of a frictional driving gearing embodying the invention. Fig. 2 is a horizontal sectional view of the same.

Referring to the drawings, it will be seen that the gearing as a whole embodies a main drive shaft 1, a driven shaft 2 and a pair of opposed, axially alined stub shafts 3 arranged counter to the driven shaft and carrying idle rotation friction wheels or disks 4 adapted for operation through the medium of a friction pinion 5 fixed for rotation with the shaft 1 and to impart motion to the shaft 2 through the medium of a transmission wheel 6 fixed for rotation with the last named shaft and arranged between and for frictional engagement with the inner faces of the pair of disks 4.

It will be observed that said disks, being mounted upon stub shafts, the inner faces of the disks are entirely unobstructed, thus permitting the transmission wheel 6 to be moved diametrically across the faces of said friction wheels. This is an important feature of the invention since, by moving the transmission wheel 6 along the shaft 2 to a point coinciding with the actual center of the disks 4, movement of the said disk 6 will cease, while, by moving it beyond this point, it will be rotated in a reverse direction. A very simple and effective means is thus afforded for reversing the direction of rotation at will.

The pinion 5, which is fixed to the shaft 1 through the medium of a spline or feather 7, is susceptible of movement longitudinally of the shaft to and from operative engagement with the disks 4 through the medium of an actuating lever 8 fulcrumed between its ends, as at 9, while the transmission wheel 6, which is in like manner connected on the shaft 2 through the medium of a spline or feather 10, is adapted for movement longitudinally of the driven shaft in a direction radially of the disks 4 for changing the speed, there being connected with the wheel 6 by means of a link 11 an operating speed controlling lever 12 fulcrumed between its ends as at 13. The transmission wheel is provided with an elastic, peripheral portion or rim 14 in the nature of a rubber tire, cemented or otherwise fixed on the wheel and designed in practice to insure the requisite frictional hold between the parts, as more fully hereinafter explained.

The stub shafts 3 on which the disks 4 are fixed are journaled for rotation each in a pair of spaced bearings and are pressed inward for maintaining the disks 4 in active position through the medium of expansible springs 16 coiled upon the shafts and bearing at their outer ends against the outermost bearings 15 and at their inner ends against bearing collars 17 adjustably fixed on the shafts through the medium of set screws 18, said collars being provided with projecting guide portions 19 which travel in contact with a fixed portion 20 to guide the shafts in their movements.

In practice, motion is transmitted from the drive shaft 1 which may be operated from any suitable source of power to the driven shaft 2 through the medium of the interengaging friction disks 4 and 5 and the transmission wheel 6, it being noted that the disk 5 may be moved into and out of engagement with the disks 4 in the operation of starting or stopping the shaft 2 by means of the lever 8, while the wheel 6 may, through the medium of the lever 12, be moved back and forth radially of the disks 4 for changing the speed of shaft 2 relative to that of shaft 1. The springs 16 act between the outer bearings 15 and collars 17 for holding the disks 4 yieldably to their work and in proper frictional engagement with the disk 5. Under normal conditions, the elastic rim 14 of the transmission wheel 6 will be under compression between the disks 4, whereby in the event of the latter yielding outwardly upon the disk 5 being brought into action the rim will expand for maintaining the requisite frictional hold upon the inner faces of the disks 4, thus to obviate loss of motion between the parts. Also through the medium of the lever 12 the transmission wheel 6 may be moved along the shaft 2 to a point beyond the axial center of the disks 4 for reversing the direction of rotation of the driven shaft, as will be readily understood.

Having thus described my invention, what I claim is:

In a changeable speed gearing, a main drive shaft and a main driven shaft supported in longitudinal and axial alinement, pairs of spaced bearings erected adjacent to and at opposite sides of the main driven shaft, fixed connecting portions or webs connecting said bearings in pairs, shafts supported for rotation in said bearings at opposite sides of and approximately at right angles to the main driven shaft, friction wheels or disks mounted upon the inner ends of said shafts and having unobstructed inner faces, collars mounted adjustably upon the wheel carrying shafts and having laterally extending guide portions traveling in contact with the fixed portions or webs connecting the bearings, springs coiled upon the shafts between the collars and the outermost bearings, and impelling the shafts in an inward direction toward each other, a friction pinion slidably engaging the main drive shaft and adapted for engagement with the rims of the friction wheels, a transmission wheel mounted slidably upon the main driven shaft and supported in engagement with the faces of the oppositely disposed friction wheels, and means for effecting adjustment of the transmission wheel diametrically across the faces of the friction wheels.

In testimony whereof, I affix my signature in presence of two witnesses.

EBENEZER H. MANNING.

Witnesses:
  EARNEST A. SKINNER,
  HALLIE DAVENPORT.